United States Patent [19]

Syrmis

[11] 4,455,320
[45] Jun. 19, 1984

[54] METHOD OF MAKING CHOCOLATE CANDY SCULPTURE OF PHOTO IMAGE

[75] Inventor: Victor Syrmis, New York, N.Y.

[73] Assignee: Chocolate Photos, New York, N.Y.

[21] Appl. No.: 429,298

[22] Filed: Sep. 30, 1982

[51] Int. Cl.³ .................... A23G 1/22; B65D 85/60
[52] U.S. Cl. .................... 426/383; 426/104; 426/392; 426/414; 426/515; 425/177; 249/55; 101/32; 264/219; 264/220
[58] Field of Search ............. 426/383, 515, 414, 104, 426/120, 392; 425/177; 264/219, 220, 225, 226, 227; 249/55, 127; 101/32

[56] References Cited

U.S. PATENT DOCUMENTS

| | | |
|---|---|---|
| 321,216 | 6/1885 | Hawley et al. .................. 426/383 |
| 727,435 | 5/1903 | Pietzner .......................... 264/219 |
| 1,792,486 | 2/1931 | Feinberg ......................... 264/225 |
| 1,906,882 | 5/1933 | Perret ............................. 426/515 |
| 1,991,617 | 2/1935 | Krein .............................. 426/383 |
| 2,032,639 | 3/1936 | Storer ............................. 249/127 |
| 2,045,730 | 6/1936 | Schepman et al. ............... 426/515 |
| 2,053,711 | 9/1936 | Glomb ........................... 249/127 |
| 2,147,770 | 2/1939 | Ford .............................. 264/219 |
| 2,181,452 | 11/1939 | Ford .............................. 264/219 |
| 2,294,865 | 9/1942 | Frankenthal et al. ............ 264/219 |
| 3,101,668 | 8/1963 | Leeds ............................. 264/226 |
| 3,251,319 | 5/1966 | Kaupert et al. .................. 264/220 |
| 3,277,541 | 10/1966 | Wilton et al. ................... 264/227 |
| 3,371,626 | 3/1968 | Hachtman ...................... 426/515 |
| 3,484,257 | 12/1969 | Gotsuji .......................... 426/414 |
| 3,545,981 | 12/1970 | Klein et al. ..................... 426/515 |
| 3,662,693 | 5/1972 | Dana .............................. 426/515 |
| 3,739,051 | 6/1973 | Smith ............................. 264/225 |
| 3,798,335 | 3/1974 | Peters ............................. 426/515 |
| 4,104,411 | 8/1978 | Pooler ............................ 426/515 |
| 4,144,300 | 3/1979 | Breeden ......................... 264/219 |
| 4,200,658 | 4/1980 | Katzman et al. ................ 426/515 |

FOREIGN PATENT DOCUMENTS

| | | | |
|---|---|---|---|
| 508257 | 6/1939 | United Kingdom ............... 426/515 |
| 897083 | 5/1962 | United Kingdom ............... 426/414 |

OTHER PUBLICATIONS

Neiman-Marcus Catalog 1978, 426/383.

*Primary Examiner*—Steven L. Weinstein
*Attorney, Agent, or Firm*—J. David Dainow

[57] ABSTRACT

A chocolate candy having its upper surface sculpted as the image of a person's face and a method for sculpting a person's face from a photograph onto a chocolate candy by adapting a photographic image of a person's face, converting the adapted image onto a transfer medium or die, and then embossing such adapted image onto chocolate candy.

11 Claims, 25 Drawing Figures

PRESSURE PLATE 13
PHOTO-ETCHED DIE 14
FOIL 15
CUSHION 16
BASE 17

METHOD OF MAKING CHOCOLATE CANDY SCULPTURE OF PHOTO IMAGE

BACKGROUND OF THE INVENTION

This invention is in the combined fields of manufacturing chocolate candy and psychiatry. Chocolate is obviously one of the most popular condiments for complex reasons of taste, various positive attributes persons often associate with chocolate and the act of eating chocolate, and certain real or alleged favorable body chemistry or mental reactions from eating chocolate candy. The actual manufacture of chocolate in its various chemical compositions is known in the prior art. The new invention herein disclosed concerns the creation on the surface of a chocolate candy of a sculpture or embossed image of a person's face adapted from a photographic image of same.

The concept of creating and embossing a design or manufacturer's name on the surface of a chocolate or other candy is well known. The novelty herein is sculpting a person's image in chocolate by taking a person's own photographic image, adapting it in a manner to render it transferrable onto a chocolate candy surface, and carrying out the steps to complete such a process and simultaneously creating a sealed container for each candy where the container top also bears the person's image.

While it is obvious that a person's facial appearance is of great concern to him or her, it was surprising to discover that many persons are very favorably disposed to having their images sculpted on a chocolate candy that will be seen and eventually eaten by themselves and others. It was also discovered, however, that a photographic image, when transferred directly onto a mold as by photo-etching, for example, and thence onto chocolate often produces a very unattractive and inaccurate replication of the photographic image and impression. It is due to the color, composition and texture of chocolate that direct photo-transfer processes, which might be obvious in the paper products industry, are wholly intolerable in making chocolate photo embossments. For example, freckles, eyes and dimples which usually comprise beauty features, are likely to appear on chocolate as blemishes, pits or worse.

The present invention has recognized the passion millions of persons have to eat chocolate and some of the obvious and subtle reasons why persons would like to have their facial image appear on chocolates they and their friends eat or give as a gift to a friend bearing the friend's own facial image on each individual chocolate candy. The applicant herein has furthermore discovered the great difficulties in transferring a photo image onto chocolate without producing an unattractive and/or inaccurate replication, and has developed a new process to achieve this end as described in following sections.

SUMMARY OF THE INVENTION

The invention comprises a sequence of steps beginning with a photograph or snapshot showing a person's face and ending with chocolate candies, each having a reasonable likeness of the photo image sculpted onto one surface of the candy. First the photo image is enlarged, or reduced as the case may be, until the height of the head is the image is about nine and a half inches, and a new photo or photoprint is thus made. This print is then placed front side downward on a trans-illumination table, a plastic frame forming a border is positioned to circumscribe the face, and then features and outline of the face are traced or drawn onto the rear side of the photoprint. One or more words, as a title or message or name of person are applied under the face, the words being formed by self-adhering plastic letters which by their width will create an embossed effect on the chocolates.

The step of tracing facial features and outline onto the rear surface of the enlarged photo or photoprint requires considerable understanding of the likely results in the final chocolate candy of each mark, indicia, or stroke one applies to the photo. To merely trace all features seen will not only produce disasterous results, but would be immensely time consuming and unnecessary for producing a reasonable likeness of the photo image. Consequently, to produce a successful and attractive chocolate sculpture one must be quite selective in choosing which indicia of a photo to trace. The selective procedure is discussed in greater detail in the Description of the Preferred Embodiment in Subsequent section.

The traced facial image plus message is placed in a photostat apparatus to produce a negative of the traced image in a greatly reduced size of $1\frac{1}{4}"\times 1\ 1/16"$. The negative is then photo-etched onto a zinc or magnesium plate which becomes the die plate. The etched features may be manually enhanced by appropriate grinding or drilling. The finished die plate is subsequently mounted in a press where it is forced against an aluminum foil, thus producing the candy embossment foil die to be used in a chocolate mold.

For high volume manufacture of the sculpted candies it is obviously desirable to have an array of rows of embossments on a single foil sheet. This can be formed by pressing a single-image die plate successively against a single foil sheet until the array of embossments is established; alternatively one can produce a plurality of negatives, position the negatives in the desired array; photo-etch the whole array on a single large die plate; and then press such die plate against a foil sheet producing the final multiple candy embossment foil. One additional variation in making the foil embossments is to photo-etch a plurality of different negatives onto one die plate at once, and subsequently to separate the die plate into individual die plates of each separate image.

To manufacture the chocolate candy units a mold of aluminum, steel or other suitable material is made having a matrix of cavities having side walls but open at both top and bottom. The foil sheet bearing an array of embossed areas of the photo image is placed on top of the mold, keyed into precise position, and a rigid plate is secured on top of the foil. This assembly is then inverted and liquid chocolate is poured into all the cavities with an embossed foil portion at the bottom of each cavity. After cooling, the assembly is dismantled and the chocolate is removed from the mold, but the individual chocolate units remain adhered to the foil.

Finally the chocolate and foil subassembly is inverted with the foil now on top. A plastic tray having an array of cavities corresponding to the array of chocolate units on the foil is made ready by applying a FDA approved double-sided adhesive tape to the top peripheral edges of each cavity in the tray. Then the foil-chocolate cluster is placed such that the chocolate units fit into the cavities respectively and the foil between the units contacts the adhesive-covered edges of the tape. Pressure is applied to join the foil to the tape on the top edges of each cavity, thereby sealing the chocolate therein. Next this total assembly is cut and separated into individual cups, each with its own foil top adhered to the cup.

These cups may be further gift packaged attractively by placing the separate sealed cups in a tray defining a plurality of depressions, followed by a mask or cover sheet having cut-outs to allow visibility of only the foil tops or container seals which bear the photo images. On top of the mask can be placed an intaglio image-bearing greeting card made by inking and pressing one of the foil dies onto the card, thereby creating a color-printed and embossed card of the chocolate image.

For purposes of inventory control and records, a code number for the particular photo-image, the quantity and arrangement of candy units and other data can be incorporated into the original tracing and adapted image and thereafter onto the foil, the die and the candies.

BRIEF DESCRIPTION OF THE DRAWINGS

FIGS. 9A–19 depict various aspects of a facial image with reference numbers to explanatory notes found on subsequent pages hereto under the sub-title "Table A".

The process of sculpting photo-images onto chocolate candy requires a thorough understanding of how photo-etched features later appear as embossments on a candy surface. The method developed herein is a sculpting technique comprising both rules and artistic sensitivity as set forth below. It is apparent with negative-positive transfers, that to produce a projection such as an ear, the die must have a corresponding recess. Similarly for the face as a whole to be elevated as a cameo from the candy surface, the die must have a corresponding recess. Thus during the tracing step, the unused areas of the photo should be blackened so that later they are not photo-etched. The instructions and guidelines are set forth as a preferred embodiment that has been found to be highly satisfactory.

The steps subsequent to the tracing step, for creating the photo-etched die and for creating the sculpted chocolate candies have been set forth in considerable detail in the Summary and Description of the Drawing sections and in the table found below.

Figures 1, 2, 3, 4, 5:
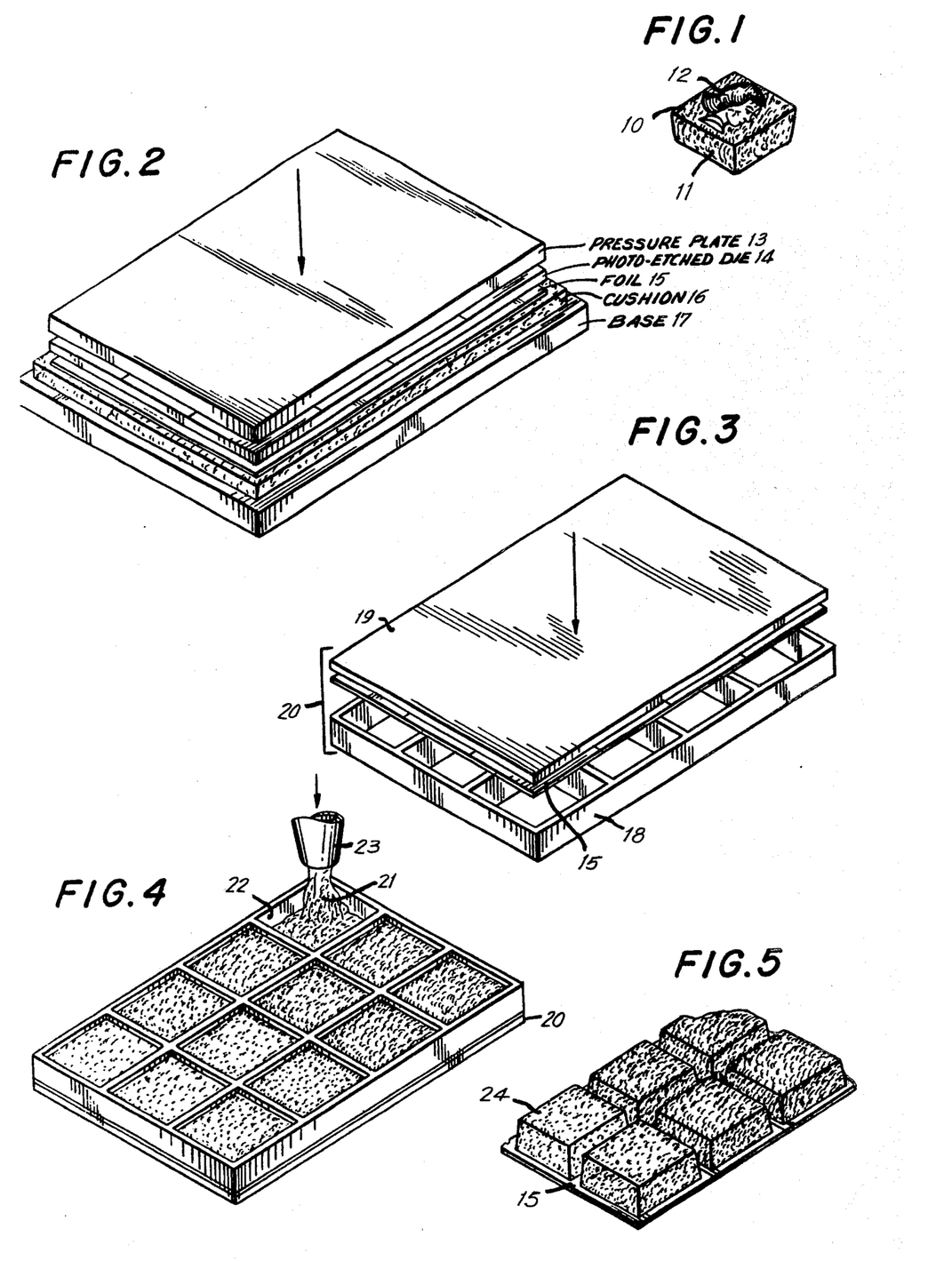
FIG. 1 is a single sculptured chocolate candy made by the method disclosed therein.
FIG. 2 shows an initial step of the method, namely embossing a sheet of aluminum foil with photo-etched die.
FIG. 3 shows a subsequent step of the method, namely securing the embossed foil onto the steel frame into which chocolate is poured.
FIG. 4 shows the step of inverting the frame of FIG. 3 and pouring liquid chocolate into the cavities.
FIG. 5 shows the step of removing chocolate candy units from the frame which units remain adhered to the foil.

FIG. 1 illustrates an individual embossed chocolate candy product 10 produced according to the present invention, the candy having slightly tapered side walls 11 and the embossed image 12 of a person's head on the top surface. FIG. 2 illustrates schematically how a photo-etched die 14 is positioned below pressure plate 13 and against foil 15 which rests upon cushion 16 and base 17. The photo-etched die 14, formed and prepared by techniques described elsewhere in the specification (see Table), is pressed against the foil to produce an array of embossments on foil 15. Next, as indicated in FIG. 3, a mold 18 is covered by the foil which is precisely positioned thereon, followed by a rigid plate 19 which results in a molding assembly 20. This assembly is then inverted as shown in FIG. 4, and liquid chocolate 21 is poured into the empty cavities 22 from a source of chocolate 23. After the poured chocolate has cooled, the assembly is dismantled, leaving individual chocolates 24 adhered to the foil 15, as indicated in FIG. 5.

Figure 6:
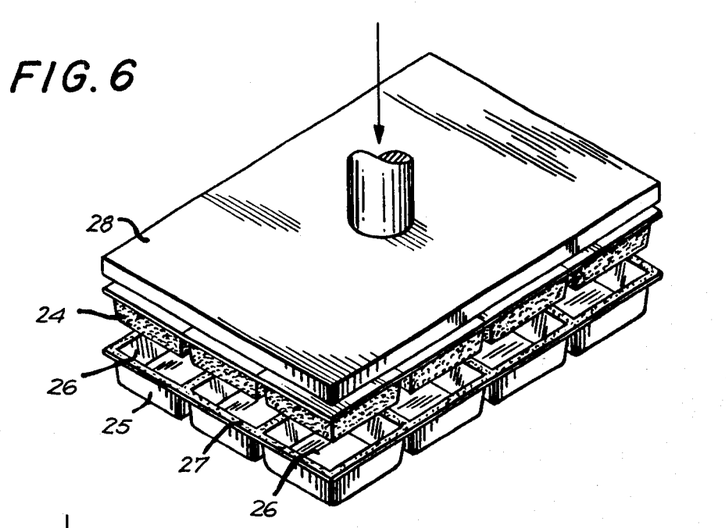
FIG. 6 shows the step of applying a double-sided adhesive mask to top edges of the tray, placing the tray cups onto the candies adhered to the foil and applying pressure to the adhesive, thus at least partially sealing the individual chocolates in cups.
Figures 7, 8:
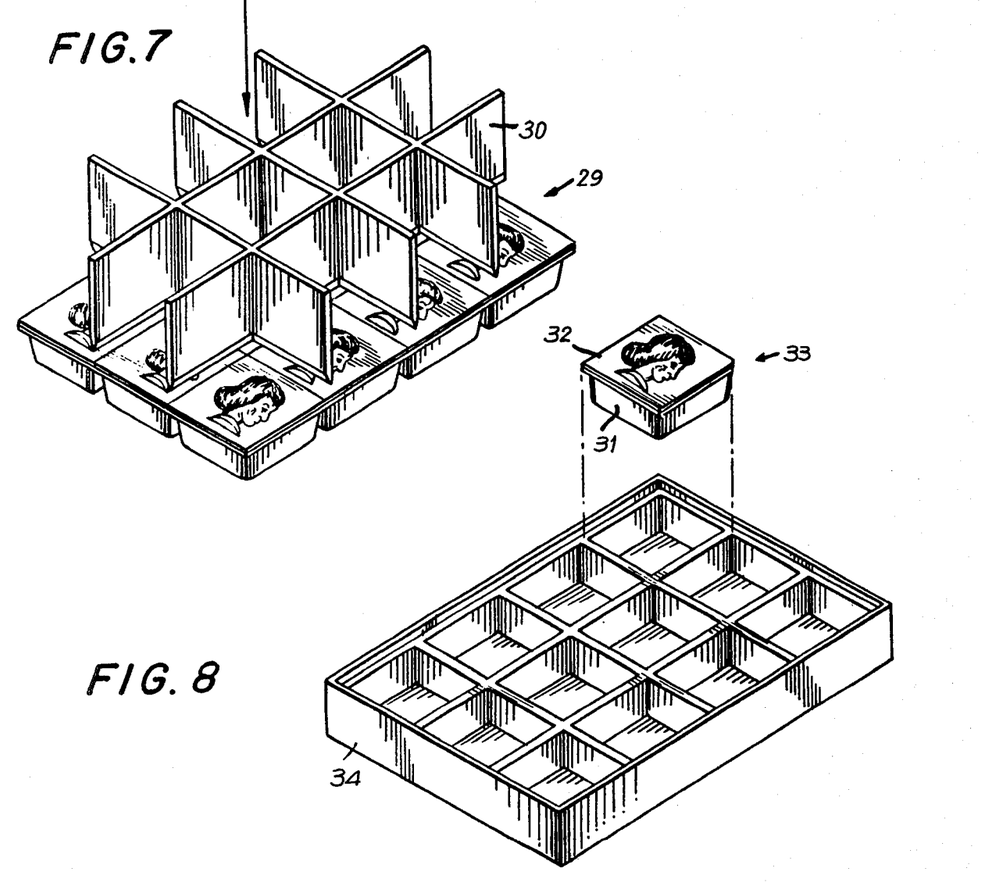
FIG. 7 shows the step of cutting the closed cups apart.
FIG. 8 shows the step of placing closed cups in a tray for final packaging.
Figure 9A:
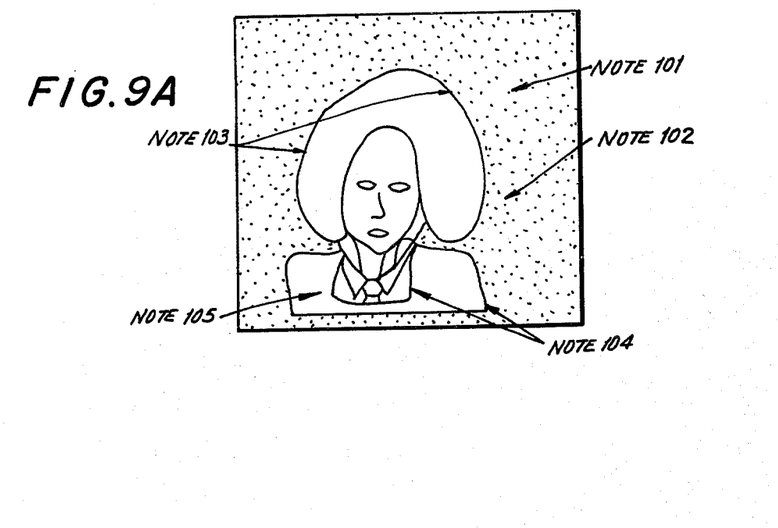
Figure 9B:
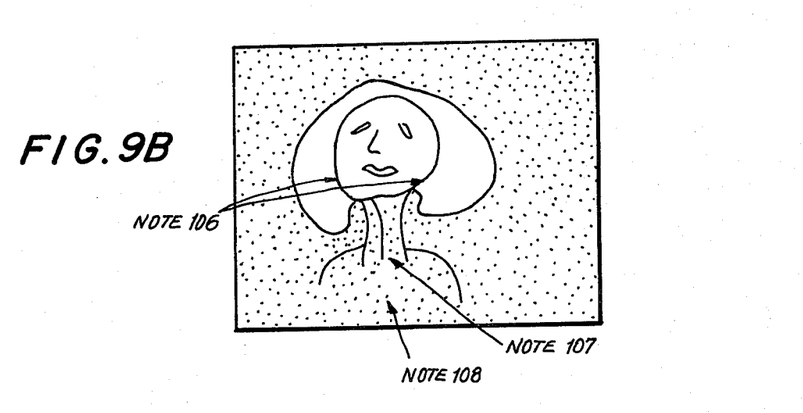
Figure 9C:
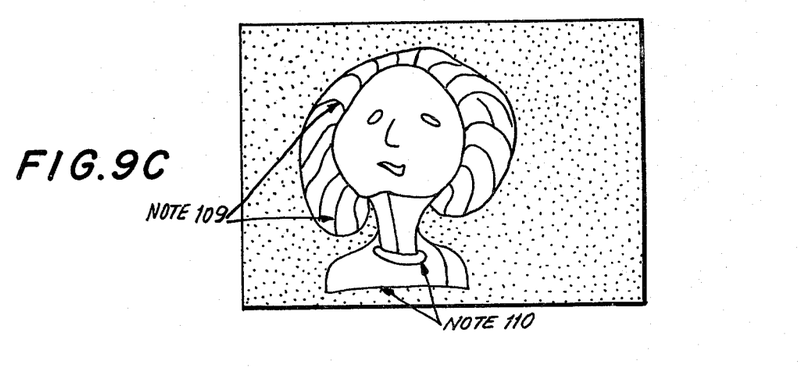

As indicated in FIG. 6, a plastic tray 25 having cavities 26 corresponding to the array of candies 24 on the foil, is prepared by having a mask 27 of double-sided adhesive tape adhered to the top peripheral edges of each cavity. Then the foil and adhered candies is positioned above the tray, and plate 28 presses the candies into the cavities and urges the foil 15 to adhere and seal with the foil. Removal of plate 28 leaves the sealed assembly 29 seen in FIG. 7 which is cut apart by cutter 30 to produce individual sealed candies, each in its own plastic cup 31 with a foil lid 32 sealed on top. Lastly said individual candy units 33 are placed in a tray or container 34 for final gift packaging.

The specific steps and techniques for tracing caricatures of faces and heads to form a suitable die and creating the sculptured chocolate candies are set forth in the schedule of general rules and Table A of references for clarifying the FIGS. 9A–19:

SECTION A (BASICS)

Rule 1: The faces (or heads) on copy print should be nine and one half inches high. This adapted or copy print is placed onto a viewing box for transillumination, face down, and directly onto the back of the copy print. The face/head is traced and caricatured by the artist.

Rule 2: Every line or mark or shading is equivalent to it being sucked back into the chocolate. The surrounding chocolate subsequently mounds outwards around the lines or marks. Using this phenomena as a desirable effect, faces of people can be done in chocolate. A form of sculpturing on chocolate can be attained using this knowledge.

Rule 3: Blacken all the areas around the face and head to "suck-in" the unused surrounding chocolate. This helps the whole head to assume a more protuberant position and take on a cameo effect. Using sculpturing (Rule 2) and cameo (Rule 3) together in various artistic combinations, finely finished faces and heads can be molded on the surface of chocolate.

Rule 4: Artist must use black ink. Draw uninterrupted, continuous, thin lines of same fine width. They should be mostly straight or slightly curved and they should mostly join up with one another, except in certain special areas, where special desired effects are required, e.g. bridged nose, receding hair, etc. For these details, see special areas, section B.

Rule 5: Neck ties, collars, shoulders are necessary. Never cross lines. "Close-off" necks and upper torso to give one a "tighter" more "economical" caricature and if this is not done then open ends allow for "loss of" face or head into the surrounding chocolate.

SECTION B (SPECIAL AREAS)

Hair: (FIGS. 9A-10): For "pulled-back hair" draw waves from anterior hair border to posterior hair border. The more hairlines that touch and join these borders the less the hair stands up, i.e. it looks pulled (oiled) down.

For "fluffed-up hair" allow a space of no lines or waves between the borders. This space allows chocolate to swell up and fill up the spaces, and pushes the hair up and out ("fluffed-up").

Avoid too many wavy lines. Hair shows up well on chocolate. Don't leave hair open (i.e. posterior border should be uninterrupted).

Figures 10, 11A, 12A, 12B, 12C, 13:
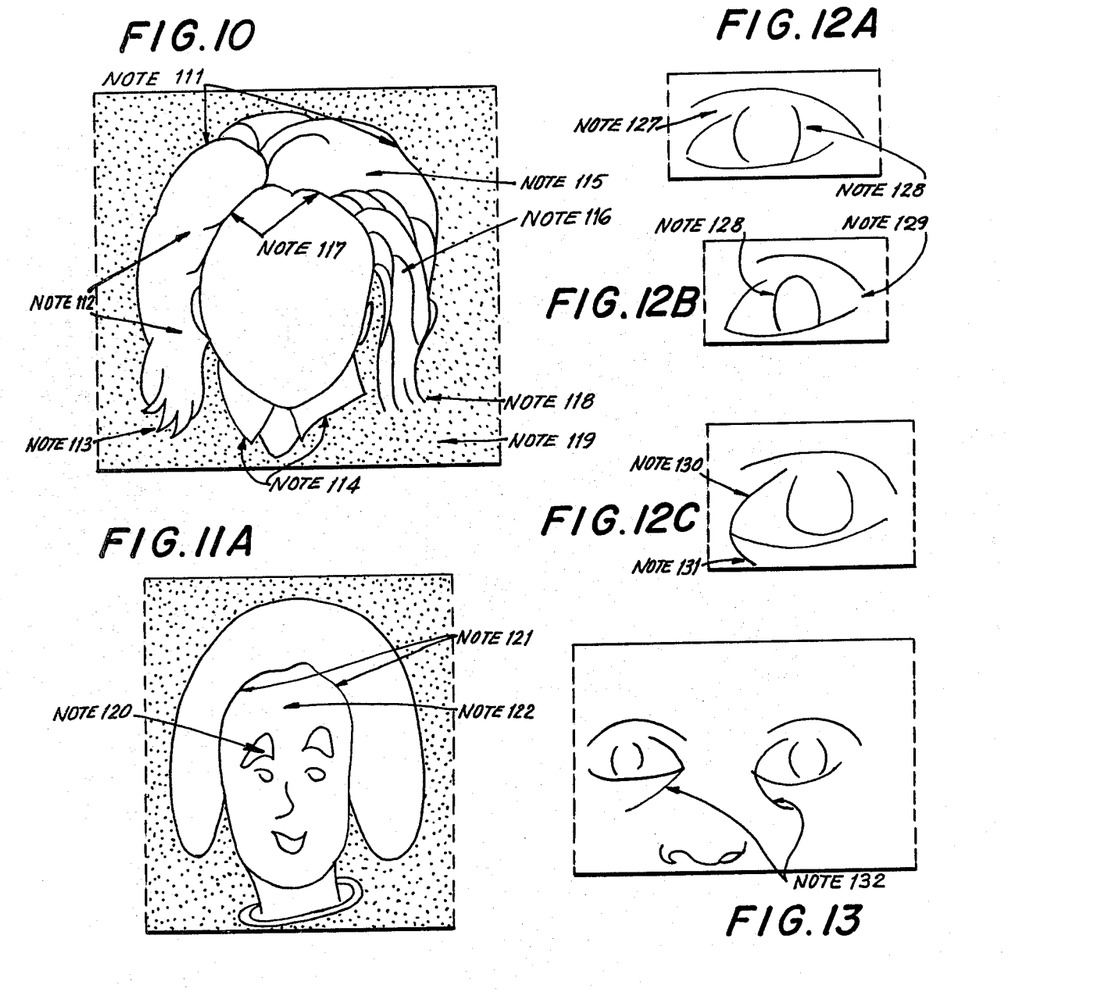

Forehead (FIGS. 11A and 11B):

(a) For "embossed forehead shape" frame it with boundaries on all sides using hair lines in an unbroken line.

Figure 11B:
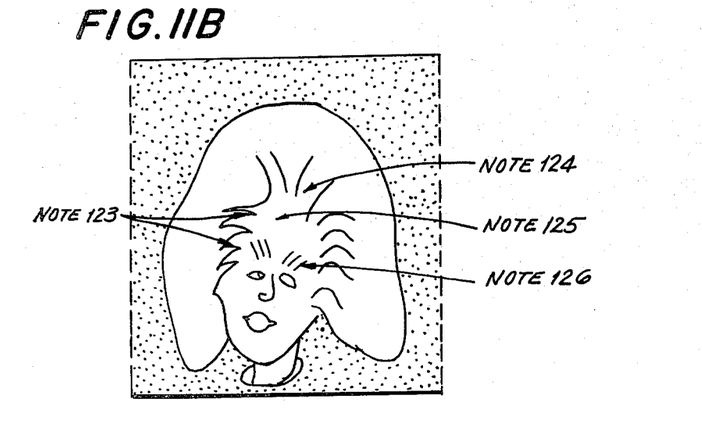

(b) To limit embossing, have hair streaks going down into the forehead area. (Streaks from hair on top, or from sides, or from eyebrows). Hair streaks can be drawn into the forehead, and from these areas on can "close off the hairs", eyebrows, side burns, anterior borders etc. or leave open the hairs in these areas.

Eyes (FIGS. 12A-12C):

(a) Eyeballs and Irises can be done just one way on chocolate. Once this is accomplished, then further other characteristics can be added, i.e. lashes, bags, crows feet, eyelids, etc. and this is the only way an eyeball and iris will appear on this chocolate.

The fewer lines around the eyes, the better, generally.

(b) If eyelashes are prominent, then add just a few and allow for sufficient space between them and the eyebrows over the upper lids. Don't cross any lines.

(c) To minimize lower bagging, add double lower lids centrally. This also increases upper nose bridging-see nose section for details. And it also adds to cheek molding.

Figure 14:
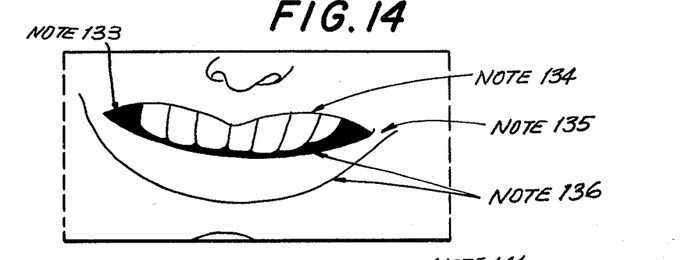

Mouth and Teeth (FIGS. 14 and 15):

(a) Mouth—All mouths must have smiles (good on chocolate). All must have upper lips, small characteristics on lips must be done small. Otherwise the result in chocolate is grossly exaggerated.

Generally one line for upper lip is all that is necessary except for fat lips.

Generally lower lips do best with both borders of the lip drawn.

Generally leaving "lip-joinings" open enhances the smile at the angles.

Figures 15, 16, 18:
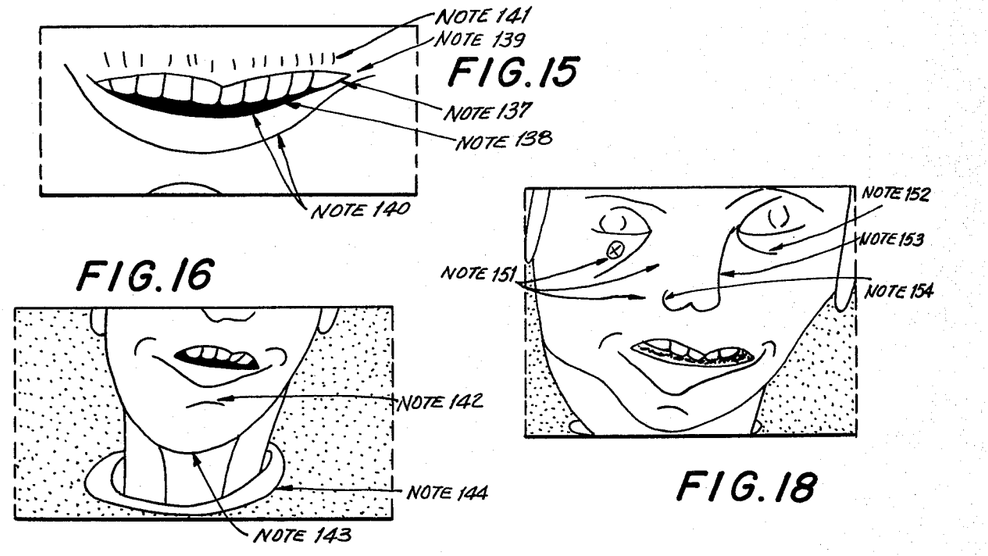

(i) A one-line lower lip leaves gross "swelling" below this line, even when chin markings are put in very well;

(ii) Moustaches should be drawn with a few hairs and only with good spaces between hairs. Too much hair will make for loss of the mouth. Too much hair blends with lips and teeth and one gets a mess on chocolate.

(b) Teeth—Teeth are done only one way on chocolates. Each tooth is outlined from upper lip line to its edge.

Each tooth joins with the adjacent tooth. Use minimal numbers of teeth for same reason as moustache hairs. Lower border of teeth-preferably they should not touch lower lip. Darken in area below teeth edges and lower lip.

Tongues are very difficult, except if they are large.

Note: All lines straight and clean.

Chin (FIG. 16): The chin is part of the lower face border, and should be clearly drawn. It stands out on chocolate like hair. One can do a double chin, if warranted. Use continuous unbroken lines for chin. Highlight its character and exaggerate it.

The chin should be demarcated from the neck. The neck has its own highlights separate from the chin, its not just that part of the chocolate below the chin. If you give it a collar etc. the neck is highlighted, otherwise the neck just melts into the surrounding chocolate taking the chin with it.

Cheeks (FIG. 17): Cheeks are mounds and must be elevated. The same directions as apply to embossed foreheads apply to cheeks. Any line will create embossing of chocolate around it, so marking for cheeks must be made so as to elevate surrounding chocolate. No line should be left ending blindly, as chocolate will swell up around its ends. Drawing curved and angled lines will make chocolate rise in the curve and angles. This way cheeks can be placed and highlighted.

Figures 17, 19:
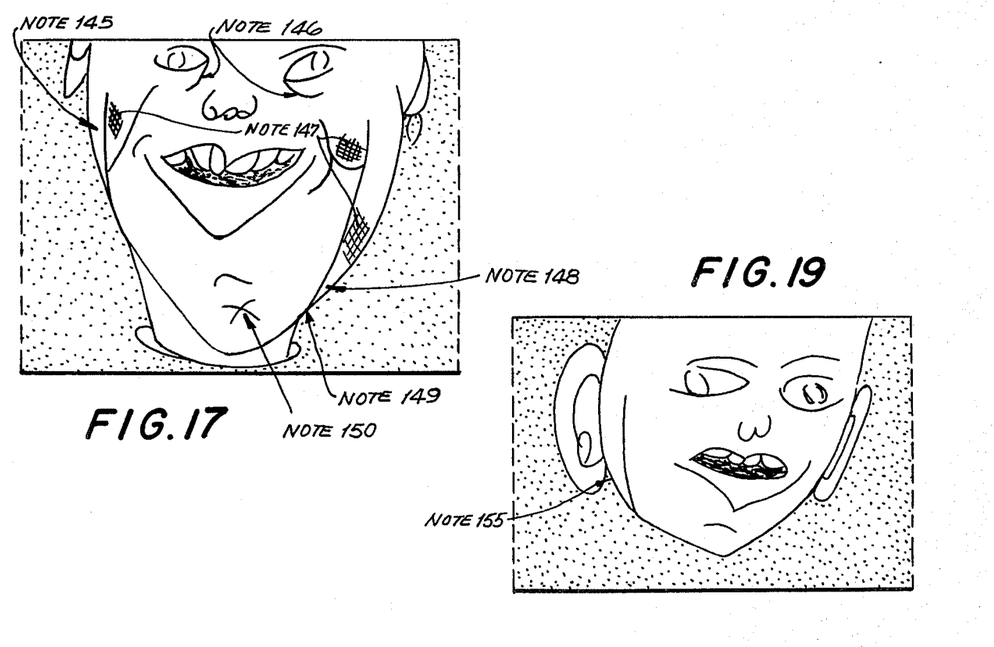

Shallow cheeks are forged by doubling the lines that outline the face.

Nose (FIG. 18): Bridges noses require both edges or sides to be drawn. For flat noses (flat bridge) do not draw borders up to eyes. Don't leave borders uncompleted; they must meet with other lines or chocolate will gather around the ends except at the bulb of the nose, which is built up anyhow.

For thin, small noses, draw thin small markings—these should be very narrow as there is always some spreading. Use markings under eyes to add to nose bridge and cheek borders.

Draw nose carefully.

Ears (FIG. 19): Drawn with same instructions as for drawing of last tooth; the inner folds of the ears can be well drawn on chocolate. Use minimum lines and draw them smallish if they are not a prominent part of the face.

TABLE A

| Feature | FIG. | Note | Test |
|---|---|---|---|
| Overall & Hair | 9A | 101 | Blacked area on copy print |
|  |  | 102 | Unused chocolate |
|  |  | 103 | Uninterrupted posterior borders of hair |
|  |  | 104 | Closed borders |
|  |  | 105 | Neck tie, collar, jacket |
| Hair | 9B | 106 | Uninterrupted anterior border of hair |
|  |  | 107 | Open neck |
|  |  | 108 | Open borders result in loss of head into the unused chocolate |
|  | 9C | 109 | Hair waves from anterior hair border to posterior hair border |
|  |  | 110 | Closed neck and lower borders (economical) |
| Hair | 10 | 111 | Posterior border |
|  |  | 112 | Fluffed hair |
|  |  | 113 | Closed off hair |
|  |  | 114 | Closed off collar and neck |
|  |  | 115 | Hair fluffed up |
|  |  | 116 | Hair pulled (oiled) down |
|  |  | 117 | Anterior border |
|  |  | 118 | Opened hair (not good) |
|  |  | 119 | Blackened background (completely) |
| Forehead | 11A | 120 | Closed off eyebrows (Encapsulated) |
|  |  | 121 | Closed off continuous anterior borders |
|  |  | 122 | Embossed forehead surrounded |

TABLE A-continued

| Feature | FIG. | Note | Test |
|---|---|---|---|
| | | | by continuous unbroken lines of eyebrows and anterior hair border |
| | 11B | 123 | Hair streaks going into forehead area but closed off hair streaks |
| | | 124 | Open, non-continuous anterior borders-hair lines going down into forehead |
| | | 125 | Un-embossed forehead |
| | | 126 | Open eyebrows (not encapsulated) |
| Eyes | 12A | 127 | Opening allows for eyeball to "fill out" |
| | 12A & 12B | 128 | Iris (pupil) best results |
| | 12B | 129 | Eye ends are open; good on chocolate |
| | 12C | 130 | Separate eyeball from nose area |
| | | 131 | Adds to nasal bridge |
| Eyes | 13 | 132 | Decreases lower lid bagging helps nose and defines cheeks very well |
| Mouth, Teeth & Tongue | 14 | 133 | Darken "hollow" of mouth |
| | | 134 | Single lines, upper lip |
| | | 135 | Open at lip joinings, increases smiling potential |
| | | 136 | Double line, lower lip (upper & lower borders) |
| | 15 | 137 | End tooth edge blends with lip |
| | | 138 | Darken for mouth-pulls chocolate inward |
| | | 139 | Open lip end for smile |
| | | 140 | Both borders for lower lip |
| | | 141 | Few moustache hairs, too many will "destroy" the whole mouth effect |
| Chin | 16 | 142 | Roundness for chin's upper border |
| | | 143 | Chin border square |
| | | 144 | Collar |
| Cheeks | 17 | 145 | Shallow cheek, i.e. double lines in this side of face |
| | | 146 | Gives cheek more upper definition |
| | | 147 | Chocolate builds up and gives cheek more defined lower border |
| | | 148 | Shallow area between lines |
| | | 149 | Join lines or ends become surrounded by raised chocolate |
| | | 150 | Don't cross lines |
| Nose | 18 | 151 | Building up at loose end but offset by other side of nose and line x under eye |
| | | 152 | Adds to bridge of nose |
| | | 153 | Line should not be left unfinished can be joined with eye |
| | | 154 | Loose ends, build up will occur |
| Ears | 19 | 155 | Blend with side of face |

Additional details concern mainly dimensions of components used in the preferred embodiment as follows. Aluminum foil sheets 0.002 inches thick have been found satisfactory. During photo-etching the die plate is etched to a depth of about 1/16". The liquid chocolate used may be standard commerical chocolate. The actual chocolate molding techniques of preparing, liquifying, pouring, and cooling the chocolate are well known in the art. Also known are standard processes of photo-etching and photographic printing of positives and negatives. What is new is the achievement and process of sculpting photo images onto chocolate candy, as described above and defined in the claims following which are intended to cover any variations in this disclosure falling within the scope and spirit of these claims.

What is claimed is:

1. A method of sculpting a facial image from a photo onto a chocolate candy comprising the steps: placing the photo front side downward on a trans-illumination table sculpting the facial image by tracing selected features and outline of the facial image onto the rear side of the photo, thus forming an adapted image, photo-etching said adapted image onto a die plate, pressing said etched surface of said die plate against a sheet of aluminum foil thereby embossing said adapted photo image onto the foil, repeating the pressing step to create an array defining at least one row of said embossments on a single foil sheet, preparing a mold for molding chocolate candies, the mold having a plurality of cavities corresponding in position and size to said array of embossments and being open at the top and bottom, securing said embossed foil to said mold said foil being oriented with the embossed surface top most to close said top of the mold, inverting said mold and pouring liquid chocolate therein, hardening said chocolate and removing said mold thus leaving said foil with an array of chocolate candies attached thereto and portions of foil exposed between said candies, preparing a tray with a plurality of recesses corresponding in position and size to said array, each recess having side walls with top edges, a closed bottom and an open top, applying an adhesive to said top edges, positioning said array of candies into said array of recesses with said exposed foil portions contacting the adhesive on said top edges and becoming secured thereto thus closing each candy within one recess, and cutting said tray along certain adhered areas thus separating said tray into a plurality of separate closed cups each containing a single sculpted chocolate candy the top surface of each cup being the embossed foil.

2. A method according to claim 1 wherein said array comprises three adjacent rows of four units each.

3. A method according to claim 1 wherein said tray comprises plastic.

4. A method according to claim 1 comprising the further steps of placing letters forming words on the rear side of the photo and including said words in said subsequently created adapted image.

5. A method of providing a sculptured image onto a chocolate candy from a photo comprising the steps of tracing selected features and outlines of the photo image onto the rear side of the photo to form an adapted image, photo etching said adapted image onto a die plate, pressing a sheet of foil against said photo-etched die plate to create a plurality of embossments of said adapted image on said foil with each embossment surrounded by and separated from adjacent embossments by an exposed marginal strip of said foil, providing a mold for molding the chocolate candies wherein the mold has a plurality of cavities each corresponding in size and position to said embossments and being open at both of the top and bottom ends, closing one of said ends of each cavity by securing said embossed foil thereto with the embossed image oriented outward of the cavity, pouring liquid chocolate into the other of said ends of each cavity, hardening said chocolate, and separating the mold from the chocolate with the foil remaining attached to said molded chocolate candy to form an array, the method comprising the further steps of providing a tray having a plurality of recesses to correspond in position and size to said array of molded candies attached to said foil, each recess having side walls with top edges, a closed bottom and an open top, applying an adhesive to said top edges, positioning said array of candies into the array of recesses with said exposed marginal strips of foil contacting the adhesive on the top edges and becoming secured thereto, thus closing each candy within one recess.

6. The method of claim 5 wherein the image is a facial image and the foil is aluminum.

7. The method of claim 6 wherein the die is repeatedly pressed against said aluminum foil at a series of locations to create an array defining at least one row of said embossments on a single foil sheet.

8. The method according to claim 7 wherein said array comprises three adjacent rows of four units each.

9. The method of claim 5 comprising the further steps of separating the trays into a plurality of separate closed cups, each containing a single sculpted chocolate candy, the top surface of each cup being the embossed foil.

10. The method according to claim 5 comprising the further steps of placing letters forming words on the rear side of the photo and including said words in said subsequently created adapted images.

11. The method according to claim 5 wherein the tray is plastic.

* * * * *